Patented Sept. 2, 1930

1,774,607

UNITED STATES PATENT OFFICE

SIMON J. LUBOWSKY, OF BROOKLYN, NEW YORK, ASSIGNOR TO METAL & THERMIT CORPORATION, OF CARTERET, NEW JERSEY, A CORPORATION OF NEW JERSEY

METHOD OF BONDING REFRACTORIES

No Drawing.     Application filed December 5, 1925.   Serial No. 73,531.

This invention relates to a novel method of producing composite refractory bodies wherein a refractory or super-refractory material in finely divided form is admixed with finely divided rutile and the mixture subjected to a temperature sufficient to fuse or sinter the rutile into a hard, homogeneous coherent product containing the admixed refractory material. Where the composite refractory is desired to have electrical conductivity, as in making resistance elements, heating is under reducing conditions.

In my copending application Serial No. 607,726. (Patent No. 1,567,445, issued Dec. 29, 1925) it has been explained that the mineral rutile exhibits to an unusual degree the property of self-binding. forming on heating, under certain conditions, a homogeneous coherent mass of remarkable strength, hardness, refractivity and resistivity to chemical agents. I have found that this property of titanium-dioxide in the form of rutile, to produce on heating to a temperature of 800 degrees centigrade or more a mass of overlapping and otherwise mutually supporting crystals, holds good also when rutile is intimately admixed, in practically any proportions with other and more refractory oxides, such as those of magnesium, calcium, aluminum, chromium, zirconium; ores such as chromite, bauxite, zircon, clays; and other refractory materials, such as graphite, sillimanite, carborundum, crystolon, etc., and the mixture subjected to calcination at an appropriate temperature to cause the mass to sinter or fuse, the resultant calcined product exhibiting an extraordinary strong mechanical bond, which greatly enhances the value of the refractories in their ordinary commercial applications.

In actual practice, about 10 per cent by weight of rutile in finely divided condition is added to any of the refractory materials hereinbefore referred to, which are also preferably finely pulverized, the ingredients preferably being intimately admixed in a pebble mill, or other appropriate mixing device. This mixture is then heated in a kiln, furnace or crucible for a period, dependent upon the nature of the refractory material treated, and at a temperature corresponding to Seger cone 12 or higher, also depending on the material treated. The resultant mass forms, in every instance, a vitreous or semi-vitreous body of great cohesive strength, compactness and homogeneity, these properties being evidenced in superior degree as compared with similar properties when other bonding means are used with the respective refractory materials.

In the event that a binder is required that will give a small shrinkage in the calcined product, I preferably, first, produce the product defined in my copending application Serial No. 607,726 by a process which consists in calcining rutile, which is then pulverized and added to the refractory and treated as hereinbefore described. It has also been found, as is the case with other types of binding materials, that the rutile becomes increasingly effective as its fineness approaches the colloidal condition, that is, as the particles become smaller and the binder surface larger. It is also true that the rutile used as a binder with any of the materials mentioned hereinbefore, or in any combination thereof, will preserve its remarkable property of becoming electrically conductive when the calcining is carried out under conditions as specifically set forth in my copending application Serial No. 636,457, that is to say, calcining the rutile in a non-oxidizing atmosphere at from 800 degrees centigrade to 1,000 degrees centigrade. It will, therefore, be apparent that the combination of the rutile and the refractory, under the conditions mentioned, admits of the production of a large number of electrically conductive refractories, of the general class of pyro-electric conductors and resistors. Specific examples of the application of the invention are as follows:

*Example 1.*—100 parts by weight of calcined magnesium oxide, ground to 100 mesh and finer, are intimately admixed in a pebble mill with 6 parts of rutile ground to 240 mesh and finer. The mixture is heated in a kiln in an oxidizing atmosphere to Seger cone 18. The product is a reddish, semi-vitreous, compact body of great hardness and tenacity.

*Example 2.*—100 parts by weight of alumina, preferably in the form of aluminothermic slag, ground to 100 mesh and finer, are mixed intimately with 20 parts of rutile, ground to 200 mesh and finer, and the mixture heated in a graphite crucible in a reducing atmosphere to cone 20. This product is a dark gray body of great hardness and strength and is electrically conductive.

*Example 3.*—Rutile is calcined in a kiln in an oxidizing atmosphere to about cone 18 or between 800 degrees centigrade and 1,000 degrees centigrade. The crystallized hard brick showing a shrinkage of about 12 per cent is reground to about 200 mesh. 10 parts by weight of this material are mixed with 100 parts of zircon and heated in a furnace to cone 20. The product is highly refractive, hard and tenacious.

What I claim is:

1. The method of bonding refractories which comprises admixing such a refractory with a finely divided rutile and bonding the mixture at a temperature sufficient to sinter said rutile and convert it into a hard, homogeneous, coherent product containing the admixed refractory.

2. The method of bonding refractories which comprises admixing such a refractory with a finely divided rutile and bonding the mixture at a temperature sufficient to sinter said rutile and convert it into a hard, homogeneous, coherent product containing the admixed refractory, the heating in bonding being under reducing conditions.

3. The method of bonding refractories which comprises calcining rutile at a temperature in excess of 800° C., comminuting the calcined rutile, admixing the comminuted material with such a refractory and bonding the mixture at a temperature sufficient to sinter said rutile and convert it into a hard, homogeneous, coherent product containing the admixed refractory.

In testimony whereof I affix my signature.

SIMON J. LUBOWSKY.